United States Patent [19]
Bierman et al.

[11] Patent Number: 4,877,594
[45] Date of Patent: Oct. 31, 1989

[54] PURIFICATION OF PHOSPHORIC ACID

[75] Inventors: Laurence W. Bierman; Michael L. Lopez; James E. Perkins, III, all of Pocatello, Id.

[73] Assignee: J. R. Simplot Co., Pocatello, Id.

[21] Appl. No.: 283,560

[22] Filed: Dec. 13, 1988

[51] Int. Cl.$^4$ ............................................. C01B 25/16
[52] U.S. Cl. ............................. 423/321 S; 423/321 R
[58] Field of Search ........................ 423/321 S, 321 R

[56] References Cited

U.S. PATENT DOCUMENTS

| 3,684,438 | 8/1972 | Gleason | 423/321 S |
| 3,764,657 | 10/1973 | Frankenfeld et al. | 423/321 S |
| 3,862,298 | 1/1975 | Beltz et al. | 423/321 S |
| 3,953,581 | 4/1976 | Ehlers et al. | 423/321 S |
| 3,993,733 | 11/1976 | Irani | 423/321 S |
| 4,117,092 | 9/1978 | Beltz et al. | 423/321 S |

Primary Examiner—Gregory A. Heller
Attorney, Agent, or Firm—Gregory O. Garmong

[57] ABSTRACT

A mixture of hydrophobic and hydrophilic extractants is used to separate phosphate values from impurities found in phosphoric acid. In one approach, impurities are removed from phosphoric acid and the phosphate values are recovered, by introducing polyphosphates and ammonium ions into the impure acid, and contacting the impure acid with a mixture of low and high molecular weight alcohols, one of which is hydrophilic and the other hydrophobic, in a single stage. The phosphate values segregate to the high molecular weight alcohol fraction, and the impurities segregate to the low molecular weight alcohol fraction. After separation of the alcohol solutions, the phosphate values and the impurities are separated from their respective extractant solutions, and the alcohols recirculated. Polyphosphates and ammonia are preferably provided by reacting a portion of the original feed acid with ammonia at elevated temperature in a pipe reactor.

19 Claims, 3 Drawing Sheets

PURIFICATION OF PHOSPHORIC ACID

BACKGROUND OF THE INVENTION

This invention relates to the processing of phosphoric acid, and, more particularly, to the preparation of phosphate values and removal of impurities from impure phosphoric acid.

Phosphoric acid is prepared by several industrial methods. In one, the "wet process", mined ores bearing phosphate values are contacted with concentrated sulfuric acid, producing a somewhat diluted phosphoric acid. The phosphoric acid is subsequently concentrated and used as the starting material in a number of further processes to produce phosphates and phosphate-containing products.

In the wet process, impurities from the ore are dissolved into the phosphoric acid by the concentrated sulfuric acid. These impurities include a wide variety of elements and compounds, such as heavy and light metals, halogens, sulfates, and the like. The impurities variously affect subsequent processing operations and uses. In some cases, the presence of the impurity adversely affects the process itself, as in forming sludges or the like that tend to clog machinery. In other cases, such as phosphates used in food preservation, the impurities themselves are unacceptable whether or not they interfere with processing.

There are numerous approaches for removing impurities from impure phosphoric acid, involving steps such as chemical extraction with a solvent, oxidation, precipitation, and the like. The choice of a particular purification process depends upon the predominant impurities, the intended use of the acid, and the availability of conditions favorable to a particular type of processing.

In one example of a purification process, a calcium salt is added to the dilute impure acid to precipitate fluorides and sulfates, which are removed by filtration or settling. The acid is then contacted to an organic extractant, typically an alcohol or an ether, to remove metallic impurities into the extractment. The impurities are stripped from the extractant, which is recycled for further use. Such extraction typically requires 3 to 7 stages of extraction to be efficient. After extraction, the acid is concentrated to about 40 percent phosphates, and further calcium salts are added to precipitate more fluorine. Finally, the acid is concentrated to a salt.

This processing is time consuming and expensive, particularly in its need for multiple stages of extraction. Multiple contacting tanks and sets of stripping reactors are required. These facilities must be made of expensive corrosion resistant materials, and are consequently expensive.

There is a continuing need for an approach to obtaining purified phosphate values from impure phosphoric acid, such as that produced by the wet process. Such an improved process should be effective and economical to operate, and preferably have a low capital cost. The present invention fulfills this need, and further provides related advantages.

SUMMARY OF THE INVENTION

The present invention provides a method for separating recoverable phosphate values and impurities from impure phosphoric acid solutions. Impurities are separated from the phosphate values economically with lower capital and operating costs than experienced with prior processes.

In accordance with the invention, a process for purifying impure phosphoric acid comprises the steps of mixing the phosphoric acid with a mixture of at least two liquid extractants to cause the phosphate values and the impurities to be segregated into the respective extractants, the first extractant preferentially dissolving the phosphate values and the second extractant preferentially dissolving the impurities, one of the two extractants being hydrophilic and the other being hydrophobic; and separating the loaded hydrophilic extractant from the loaded hydrophobic extractant.

More specifically, and also in accordance with the invention, a process for purifying impure phosphoric acid comprises the steps of furnishing impure phosphoric acid having from about 52 to about 72 percent by weight phosphate; diverting from about 5 to about 25 percent of the impure acid to a pipe reactor wherein the acid is heated and ammonia is added to the heated acid, whereby the orthophosphates in the acid are converted to polyphosphates, thereby forming a polyphosphate melt; introducing the polyphosphate melt into the impure acid; mixing the prepared acid with a mixture of alcohols, the mixture of alcohols including both a low molecular weight alcohol selected from the group of alcohols having from 1 to 3 carbon atoms, and mixtures thereof, and a high molecular weight alcohol selected from the group of alcohols having from 4 to 12 carbon atoms; and mixtures thereof; separating the mixture of alcohols and prepared acid into two fractions, a first fraction including the high molecular weight alcohol and the phosphate values dissolved therein, and a second fraction including at least one of the low molecular weight alcohol and the impurities originally present in the impure phosphoric acid; separating the phosphate values from the high molecular weight alcohol of the first fraction; recycling the separated high molecular weight alcohol to the step of mixing; separating the impurities from the low molecular weight alcohol of the second fraction; and recycling the separated low molecular weight alcohol to the step of mixing. The separation of the low and high molecular weight alcohols from each other will normally not be perfect and complete, but this degree of separation is acceptable. Thus, the first fraction, while predominantly the high molecular weight alcohol, will typically include some low molecular weight alcohol therein, and the second fraction, while predominantly the low molecular weight alcohol and water, will typically include some high molecular weight alcohol therein.

This embodiment of the invention uses an extractant having two alcohols, a low molecular weight alcohol and a high molecular weight alcohol. The extractant is mixed with the impure phosphoric acid aqueous solution, and then permitted to separate. Upon separation, the phosphate values preferentially segregate to the high molecular weight alcohol fraction and the impurities preferentially segregate to the low molecular weight alcohol fraction (which also is aqueous, since the low molecular weight alcohol is hydrophilic).

Once separated in this manner, the phosphate values are recovered from the high molecular weight alcohol fraction, and the impurities separated from the low molecular weight alcohol. Preferably, the phosphate values are precipitated with an addition of sodium, potassium, calcium, or ammonium ions, and the crystals removed in a settling cone so that the high molecular weight alcohol can be reused in extraction. The remaining alcohol is removed by centrifuging and the solid phosphates are dried. Preferably, the low molecular weight alcohol is distilled from the impurities for reuse in the extraction operation. The impurities may be further treated to obtain potentially useful components, and the remainder discarded.

The low molecular weight alcohol is an alcohol derived from a molecule having 1-3 carbon atoms. The low molecular weight alcohol is preferably methyl alcohol, also termed methanol, having a chemical formulation of $CH_3OH$. The high molecular weight alcohol is an alcohol derived from a molecule having 4-12 carbon atoms. The high molecular weight alcohol is preferably hexanol, having a chemical formulation $C_6H_{13}OH$.

The relative amounts of the alcohols and the impure acid may vary. There must be an effective amount of each alcohol sufficient to form a phase into which the extracted species can dissolve, which in turn is dependent upon the alcohols selected and the amount of the extracted species to be dissolved. These amounts may also vary according to the nature of the ore and the details of processing. By way of example and not of limitation, for the processing of a typical Idaho phosphate ore that is converted by the wet process to an impure phosphoric acid having from 52 to 72 percent phosphate expressed as $P_2O_5$, the preferred amounts of the alcohols are 0.5 parts methanol and 4 parts hexanol, for each one part impure phosphoric acid feed (the parts begin expressed by volume).

The selective separation of the impurities and phosphate values in the two-component extractant is preferably aided by the addition of two modifiers to the impure acid, prior to contacting it to the extractant. One modifier is a polyphosphate added to the acid, wherein the phosphates are otherwise largely in the form of orthophosphates. The other modifier is a monovalent cation, preferably ammonium. It has been observed that the addition of such species to the impure acid, prior to contacting it to the extractant, significantly improves the ability of the extractant to extract and separate the phosphate values (to the high molecular weight alcohol fraction) and the impurities (to the low molecular weight alcohol and water fraction).

The polyphosphates and preferred ammonium cation are preferably and conveniently furnished by reacting a portion of the incoming impure acid to produce a modified acid containing ammonium polyphosphates, and then adding the modified acid back into the impure acid before commencing extraction. In a favored approach, a portion of the incoming impure phosphoric acid, typically about 5 to about 25 percent by volume, is diverted to a pipe reactor apparatus of the kind normally used to manufacture ammonium phosphate for fertilizers. In the pipe reactor, the acid is heated and ammonia is injected to form a phosphate melt. Ammonium ions are present in the melt, and a portion of the orthophosphates originally present in the acid are converted to the required polyphosphates.

More generally, a process for purifying impure phosphoric acid comprises the steps of furnishing impure phosphoric acid; adding to the impure phosphoric acid, to form a modified acid, a modifier selected from the group consisting of a polyphosphate, and a cation selected from the group consisting of ammonium ion and an alkali metal ion; mixing the modified acid with a mixture of alcohols, the mixture of alcohols including both a low molecular weight alcohol selected from the group of alcohols having from 1 to 3 carbon atoms, and mixtures thereof, and a high molecular weight alcohol selected from the group of alcohols having from 4 to 12 carbon atoms, and mixtures thereof; separating the mixture of alcohols and prepared acid into two fractions, a first fraction including the high molecular weight alcohol and the phosphate values dissolved therein, and a second fraction including the low molecular weight alcohol and the impurities originally present in the impure phosphoric acid. As described previously, the separation of the alcohols from each other is usually not perfect, but is nevertheless acceptable.

The modifier added to the acid may come from any suitable source. Preferably, the diversion and pipe reactor approach discussed earlier is used. The cation may be alkali metals such as sodium or potassium, as well as ammonium. After separation of the two fractions of low molecular weight alcohol and impurities, and high molecular weight alcohol and phosphate values, the fractions are themselves separated by whatever means is appropriate. The low molecular weight alcohol fraction can ordinarily be distilled to recover the alcohol, leaving the impurity material to be later recovered. The high molecular weight alcohol is more difficult to distill, because of its higher boiling point, but distillation is feasible. More typically, the phosphate values are precipitated and separated from the alcohol as a solid. Another approach is to wash the phosphate values from the organic with water or dilute phosphoric acid in a series of stripping stages. In separation of both fractions, the alcohol is recovered for recycling to the extraction.

The present invention provides a method for segregating the impurities from the phosphate values, in a single stage of processing. This approach is contrasted with prior methods, wherein 3 to 7 stages are normally required. The present method is therefore more efficient and less costly, due to lower capital and operating costs and higher throughput. Other features and advantages of the present invention will be apparent from the following more detailed description of the preferred embodiment, taken in conjunction with the accompanying drawings, which illustrate, by way of example, the principles of the invention.

DETAILED DESCRIPTION OF THE PREFERRED EMBODIMENT

The present invention is preferably utilized in conjunction with the recovery of phosphate values in the form of solid phosphates, from wet process phosphoric acid. The preparation of the wet process acid is not part of the present invention, but generally involves the contacting (digesting) of mined and beneficiated phosphate-bearing ore with concentrated sulfuric acid. Phosphate values and impurities are dissolved into the sulfuric acid, resulting in impure dilute phosphoric acid. The impure phosphoric acid is preferably first concentrated by evaporation of water so that the phosphate content is 52 to 72 percent by weight phosphate, expressed as $P_2O_5$. Lower strength acids may be used as the feed material to the process of the present invention, but the recovery of phosphates is decreased.

The concentrated acid produced by the wet process additionally contains impurities mined with the ore and digested or reacted by the concentrated sulfuric acid. The impurities include, for example, a variety of anions such as fluorides from calcium fluorite, sulfates, and cations including metallic ions such as the heavy metals. By way of example, typical western phosphate ores contain about 10 percent by weight phosphate. The 52 percent acid produced from the ore usually contains about 5 percent by weight total metallic impurities, principally iron, aluminum, and magnesium. Many other naturally occurring elements are present in the ore and dissolved into the acid, in amounts ranging from a few tenths of a percent to parts per million. These impurities may interfere with later production operations, and often render the acid produced by the wet process noncompetitive with the purer "white acid" produced by the electric furnace process. The present process provides a method for removing many of the harmful impurities from the phosphoric acid prior to crystallization and drying of the phosphates.

The phosphates present in the impure acid produced by the wet process are largely in the form of orthophosphates, with a small percentage of polyphosphates present. Phosphoric acid may be generally represented by the form $HO[HPO_3]_nH$. When n is 1, the acid is orthophosphoric acid, and when n is greater than 1, the acid is polyphosphoric acid. Polyphosphoric acid includes a number of variations. When n is 2, the acid is called pyrophosphoric acid; when n is 3, the acid is called tripolyphosphoric acid; when n is 4, the acid is called tetrapolyphosphoric acid; and there are higher n varieties. Collectively, all of these forms of phosphoric acid with n greater than 1 are called polyphosphoric acid.

Figure 1:
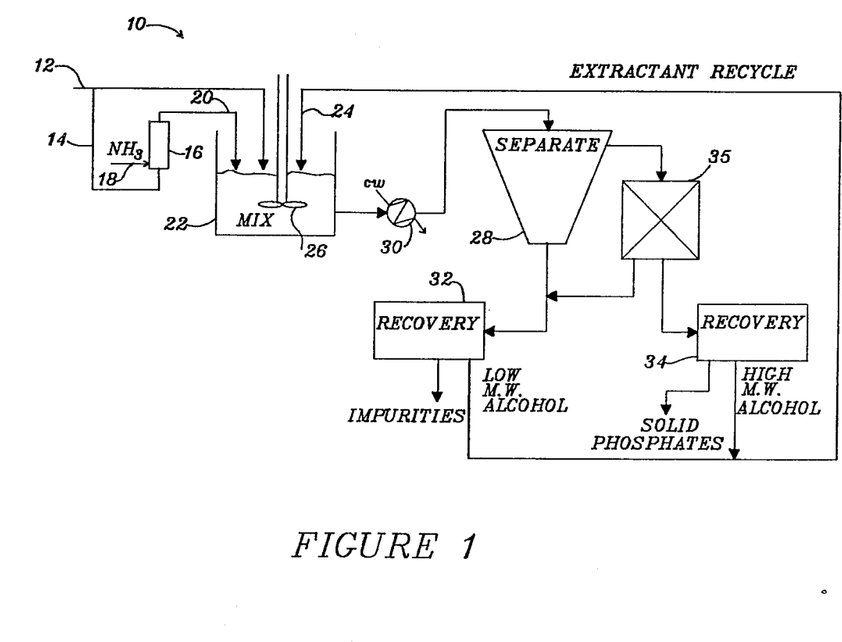
FIG. 1 is a process flow chart for the preferred process of the invention.

Referring to FIG. 1, a process 10 for providing solid phosphates of reduced impurity content, from wet process phosphoric acid, begins with the provision of a feed 12 of such wet process acid. To aid in the separation of the impurities, by the method to be discussed subsequently, it has been found desirable to add either or both of two ingredients to the concentrated wet process phosphoric acid. The first is a polyphosphate. While not wishing to be bound by this explanation, it is believed that metal polyphosphate complexes are less soluble in high molecular weight alcohol extractants than are metal orthophosphates. The inclusion of polyphosphates in the acid encourages the formation of such metal polyphosphates and their removal with a low molecular weight alcohol.

The second added ingredient is a cation such as ammonium ion, although alkali metal cations are also operable. While not wishing to be bound by this explanation, it is believed that these cations react to form compounds with a variety of anionic impurities, the resulting compounds being soluble or precipitated in mixtures of low molecular weight alcohols and water, but less so in high molecular weight alcohols.

Fortunately, both polyphosphates and ammonium may be readily provided by diverting a portion 14 of the feed 12 to a reactor such as a pipe reactor 16, wherein a large fraction of the acid orthophosphates are converted to ammonium polyphosphates. This conversion process is known in the art of fertilizer manufacture. Briefly, the diverted portion 14 of orthophosphoric acid is heated to a temperature of from about 100° F. to about 700° F., when the ammonia gas 18 is added. The result is a polyphosphate melt wherein the phosphate is present in the form of an ammonium polyphosphate flow 20. Other species are also present in the flow 20, but the presence of the ammonium polyphosphate is the key requirement. The amount of the diverted portion 14 is preferably from about 5 to about 25 percent of the feed 12, by volume, which yields a sufficient amount of both ammonium cation and polyphosphates for the next operation. Lesser amounts would not provide the necessary amount of modifier. Larger amounts would not be harmful, but are not needed for typical impurity levels and would decrease the amount of recovered purified phosphate.

The remainder of the unmodified feed 12 and the ammonium polyphosphate feed 20 are added to a reactor 22. Also added to the reactor 22 is an extractant mixture 24. The extractant 24 is a mixture of at least two extractants, a low molecular weight alcohol and a high molecular weight alcohol. The low molecular weight alcohol is defined as an organic alcohol having from 1 to 3 carbon atoms. The high molecular weight alcohol is defined as an organic alcohol having from 4 to 12 carbon atoms. The preferred low molecular weight alcohol is methanol, and the preferred high molecular weight alcohol is hexanol. In the reactor 22, the acid feed 12, ammonium polyphosphate feed 20, and extractant mixture 24 are thoroughly mixed together by a direct agitation mixer or static mixer 26.

The amounts of the alcohols extractants required to be added to the reactor 22 depend upon the character of the acid feed 12 and the details of process selection. As will be seen, the phosphate values are preferentially soluble in the high molecular weight alcohol (which is hydrophobic), and the impurities and water are preferentially soluble in the low molecular weight alcohol (which is hydrophilic and thence in aqueous solution). (As used in this context, the term "soluble" is intended to include conventional dissolution as well as complexing of ions, with or without precipitation. The precise mechanisms are not limiting of the invention, and it is important only that there is the preferential separation.) The amounts of the alcohols must be sufficient to dissolve the respective solutes, and depend, among other factors, on the alcohols chosen and their ability to dissolve the solutes, the phosphate content and impurity content of the feed 12, temperature, and processing equipment chosen. In the illustrated preferred process, it has been found that a ratio of 0.5 parts methanol and 4 parts hexanol, to 1 part 52 percent acid feed 12, is operable and is preferred. As indicated, these ratios may vary depending upon the feed and process parameters, as long as the indicated functions are achieved.

The phosphate values are preferentially soluble in the hydrophobic high molecular weight alcohol extractant. The low molecular weight alcohol is hydrophilic, absorbing water and preferentially dissolving impurities.

The mixture outflow from the reactor 22 is permitted to separate into two extraction phases in a separator, preferably a settling cone 28. It is desirable that the separation be accomplished in the range from ambient temperature to 140° F., so that settling is readily accomplished and so that the vapor pressures of the extraction phases are not too high. If the outflow from the reactor 22 is too hot, it is passed through a cooler 30 to cool it to about ambient temperature. The cooler 30 is preferably a cold water heat exchanger.

In the settling cone 28, two fractions are formed. A heavier raffinate fraction includes the lower molecular weight alcohol, water from the acid feed 12, and impurities originally present in the acid feed 12. A lighter fraction includes the high molecular weight alcohol and the phosphate values. At this point, the process 10 has achieved its primary objective, the separation of the phosphate values from the impurities.

It will of course be appreciated that no process of this type is fully efficient, and that there will be some intermixing between the fractions. However, it will also be appreciated that this process achieves, in one stage of reaction and separation, a high degree of separation of the phosphate values from the impurities. Prior approaches using a single alcohol or the extractant typically require 3 to 7 stages of extraction of phosphate values from an input feed, leaving the impurities in the feed. The present process differs in that the feed is extracted into two separate fractions in a single stage, rather than having multiple stages of extraction of a single phosphate containing fraction from the acid feed.

The heavy raffinate phase contains the remaining polyphosphate, ammonia, most of the metallic cation impurities, and the majority of the non-phosphate anions. These constituents may be dissolved when there is sufficient water in the feed acid, as in the 52 percent acid, or precipitated as solids in the low molecular weight alcohol phase when the feed acid strength is increased toward the 72 percent acid. The phosphate values in this raffinate may be recovered by distilling the methanol when the raffinate is a liquid. When the raffinate is a solid, it may be filtered and repulped in impure acid streams, or water may be added to dissolve the solids and then methanol distilled from the solution. Typically, the purified acid contains from 60 to 80 percent of the phosphate that was fed to the system, and about 500 parts per million (ppm) remaining of cation impurities, about 1 percent sulfate, less than 0.1 percent fluoride, and minor amounts of other cations.

At this point, the desired separation is complete, but it is desirable to provide a process extension whereby the alcohols are recovered for recycling to the process 10, and the phosphate values and impurities are recovered. To achieve this process extension, the impurity-laden aqueous fraction is further processed in a low molecular weight alcohol recovery process 32, in which the alcohol is recovered for recycling to the reactor 22 and the impurities are removed for further processing or discard. The phosphate containing light fraction is further processed in a high molecular weight alcohol recovery process 34, in which the alcohol is recovered for recycling to the reactor 22 and the phosphate values are removed. (To aid in further separation of the phases, the overflow is passed through a coalescer 35, and the coalesced droplets of the heavier fraction are returned to the underflow.) The recovered low and high molecular weight alcohols are combined in a recycle flow, and, together with any makeup alcohol required, conducted back to the reactor 22 for reuse as the mixture 24.

Figure 2:
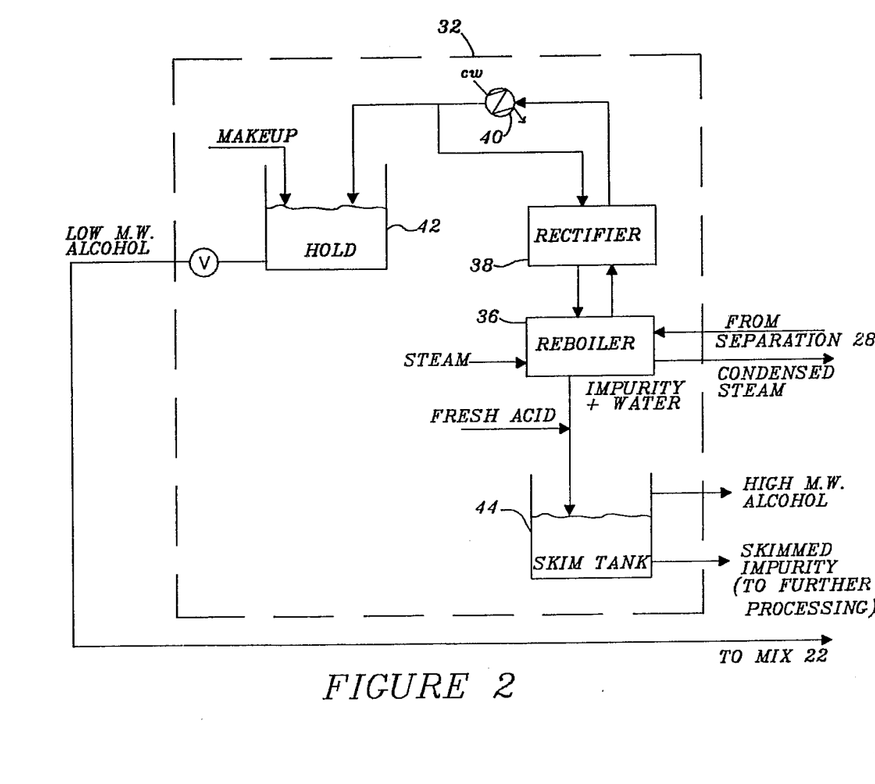
FIG. 2 is a process flow chart for recovery of the low molecular weight alcohol.
Figure 3:
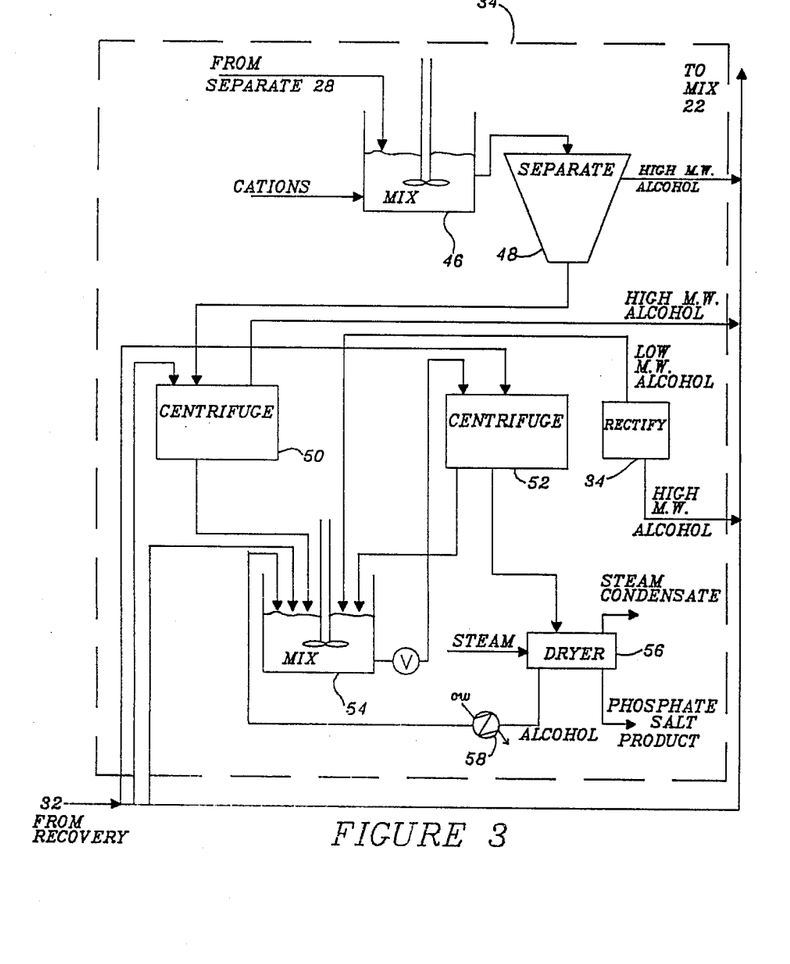
FIG. 3 is a process flow chart for recovery of the high molecular weight alcohol.

FIGS. 2 and 3 illustrate the recovery processes in greater detail. The recovery process 32 (FIG. 2) for the low molecular weight alcohol is a distillation of the alcohol, leaving the impurities. The heavy fraction from the settling cone 28 is provided to a reboiler 36, in which the low molecular weight alcohol is heated and vaporized by a flow of process steam. The temperature is maintained so that the alcohol is vaporized, but impurities and water are not vaporized. The alcohol vapor is collected and conveyed to a rectifier 38 and condenser 40. The condensed low molecular weight alcohol is stored in a tank 42, to which makeup alcohol is added, as needed. From this tank 42, low molecular weight alcohol is recycled back to the reactor 22, either directly or, in this preferred process, by way of the recovery process 34.

The unvaporized impurity material in water from the reboiler 36 is mixed with a fresh acid stream to maintain it in a fluid state, and conducted to a skim tank 44. Any high molecular weight alcohol that may have found its way to the heavy fraction is then separated by skimming and recovered. The underflow acidic impurity material is conducted to further processing which is beyond the scope of this invention. In such processing, the remaining phosphate and some impurities may be recovered, if such recovery is economically justified, and the residual material is discarded.

In the high molecular weight recovery process 34 (FIG. 3), the overflow light fraction from the settling cone 28 (by way of the coalescer 35), containing the high molecular weight alcohol and phosphate values, is provided to a salt crystallizer 46. In the crystallizer 46, a sufficient amount of an appropriate cation such as sodium or ammonium is added to cause the phosphate values to form a solid salt, such as sodium phosphate or ammonium phosphate. The mixture of solid salts and alcohol is separated in a settling cone 48. In the settling cone 48, the majority of the high molecular weight alcohol is separated from the solid, so that it can be recycled back to the reactor 22.

The salt removed from the settling cone 48 remains wet with the high molecular weight alcohol, and must be dried for shipment and to recover the alcohol. The salt is provided to a two-stage centrifuge to remove further alcohol. In the first stage centrifuge 50, some alcohol is removed, and in the second stage centrifuge 52, further alcohol is removed. Low molecular weight alcohol from the tank 42 is used to wash the semi-solid phosphate in the first stage centrifuge 50 and the second stage centrifuge 52. Additional low molecular weight alcohol from the tank 42 is used to repulp the semi-solid phosphate removed from the first stage centrifuge 50 before it is added to the second stage centrifuge 52, in a repulp tank 54.

After removing most of the alcohols in the centrifuges 50 and 52, the nearly dry solid phosphate salt is provided to a solvent recovery dryer 56, for final drying by heat from process steam. The alcohol driven off at this point is condensed in a condenser 58 and added back to the repulp tank 54. The solid salt is continuously removed from the dryer 56.

The details of the recovery processes 32 and 34 have been chosen for convenience and economy in the circumstances in which the present invention is preferably applied. They are not to be taken as limiting of the invention in any respect.

The following examples are presented to illustrate aspects of the invention, and should not be taken as limiting the invention in any respect.

EXAMPLE 1

In a continuous bench-scale process, 19.1 milliliters per minute of 52 percent (phosphate) wet process phosphoric acid at a temperature of 150° F. and 2.4 milliliters per minute of 10-34-0 (nitrogen, phosphorus, potassium) ammonium polyphosphate were mixed with with 119.5 milliliters per minute of hexanol and 12 milliliters per minute of methanol. The aqueous raffinate second fraction was separated from the phosphate-loaded first fraction by density separation. The phosphate-loaded first fraction was produced at the rate of 143 milliliters per minute, and the raffinate fraction was produced at the rate of 11 milliliters per minute. The phosphate values were separated from the first fraction by precipitation as ammonium phosphate salt, which was washed, centrifuged, and dried. The raffinate second fraction was stripped of its methanol by boiling at 230° F. to produce a final raffinate.

Samples of the phosphate-containing product salt and the final raffinate were analyzed, and found to have the following distributions and compositions. In Table 1, the "Percent Distribution" states the percentage of each component of the feed stream that reaches the indicated product. The "Actual Composition" states the composition of the indicated product, on a wet basis. (Thus, the compositions are not expected to add to 100 percent.) All percentages are by weight.

TABLE 1

|  | Percent Distribution Of Feedstream; % | | Actual Composition, % | |
| --- | --- | --- | --- | --- |
|  | Raffinate | Salt | Raffinate | Salt |
| $P_2O_5$ | 25.0 | 75.0 | 37.5 | 59.9 |
| $Al_2O_3$ | 96.2 | 9.8 | 2.33 | .079 |
| $Fe_2O_3$ | 92.6 | 7.4 | 1.14 | .069 |
| MgO | 98.4 | 1.6 | 0.91 | .01 |
| $Na_2O$ | 94.1 | 5.9 | ** | .004 |
| $K_2O$ | 98.4 | 1.6 | ** | .002 |
| ZnO | 64.3 | 35.7 | ** | .044 |
| $SO_4$ | 64.2 | 35.8 | ** | 1.07 |
| Cd | 84.3 | 15.7 | ** | .001 |
| F | 82.8 | 17.2 | ** | .16 |
| V | 98.8 | 1.2 | ** | .003 |

**No measurement made

The phosphate values are preferentially distributed to the salt, and the impurities are, for the most part, preferentially transferred to the raffinate phase.

EXAMPLE 2

The effect of the ammonium phosphate modifier was determined. A fresh batch of 50 grams of the 52 percent phosphoric acid solution described in Example 1 was mixed with 15 grams of methanol and 150 grams of hexanol. No 10-34-0 ammonium polyphosphate was added. A 2.6 gram portion of distilled water was added to maintain the water content of the mixture, the amount of water otherwise provided by the 10-34-0. The phosphate containing first fraction was separated from the raffinate using a separatory funnel. The first fraction was stripped twice with 50 milliliters of distilled water to remove the phosphate and impurity values from the first fraction. The raffinate second fraction (17.6 grams) and the phosphate containing first fraction were analyzed, with the following results. The conventions are as for Table 1.

TABLE 2

|  | Percent Distribution Of Feedstream, % | | Actual Composition, % | |
| --- | --- | --- | --- | --- |
|  | Raffinate | Salt | Raffinate | Salt |
| $P_2O_5$ | 37.2 | 62.8 | 55.5 | 11.5 |
| $Al_2O_3$ | 52.3 | 47.7 | 2.70 | .30 |
| $Fe_2O_3$ | 57.0 | 43.0 | 1.33 | .12 |
| MgO | 68.8 | 31.2 | 1.23 | .07 |

Comparing the results of Tables 1 and 2, the use of the ammonium polyphosphate modifier significantly increases the distribution of the phosphate into the salt, and decreases the distribution of the impurities into the salt. The purity of the salt is also significantly better when the ammonium polyphosphate modifier is used.

EXAMPLE 3

A fresh batch of 100 grams of 52 percent phosphoric acid, as described in Example 1, was mixed with 15 grams of 10-34-0 ammonium polyphosphate and 300 grams of hexanol. No methanol was used. After permitting the mixture to stand for several hours to permit phase separation, the experiment was abandoned due to failure to achieve a substantial separation of the raffinate from the phosphate-containing phase.

EXAMPLE 4

Phosphate-containing salts were prepared from the first fraction. A fresh batch of 100 grams of 52 percent phosphoric acid, as described in Example 1, was mixed with 15 grams of 10-34-0 ammonium polyphosphate, 30 grams of methanol, and 300 grams of hexanol. The raffinate was separated by density separation, leaving the phosphate-loaded first fraction. To 100 grams of the first fraction material, 10.5 grams of $Na_2CO_3$ and 13.3 grams of water were added to produce 24.9 grams of $Na_2HPO_4.7H_2O$, a 93.8 percent yield. The final product was analyzed, yielding the results shown in Table 3, wherein all percentages are by weight.

EXAMPLE 5

Example 4 was repeated as to the preparation of the first fraction material. To 100 grams of the first fraction material, 4.93 grams of $CaCO_3$ and 2.67 grams of water were added to produce 12.1 grams of $Ca(H_2PO_4)_2.2H_2O$, a 97.3 percent yield. The final product was analyzed, yielding the results shown in Table 3.

EXAMPLE 6

Example 4 was repeated as to the preparation of the first fraction material. To 100 grams of the first fraction material, 9.9 grams of $CaCO_3$ and 4.4 grams of water were added to produce 16.3 grams of $CaHPO_4.2H_2O$, a 96.1 percent yield. The final product was analyzed, yielding the results shown in Table 3.

TABLE 3

|  | Data From Example 4 | Data From Example 5 | Data From Example 6 |
| --- | --- | --- | --- |
| $P_2O_5$ | 49.5 | 52.7 | 54.1 |
| $Na_2O$ | 38.7 | .0027 | .0031 |
| CaO | ** | 11.5 | 21.0 |
| $Al_2O_3$ | .22 | .15 | .0153 |
| $Fe_2O_3$ | .14 | .17 | .0699 |
| MgO | .05 | .0222 | .14 |
| $K_2O$ | .01 | .01 | .01 |
| ZnO | .0331 | .0175 | .0190 |
| $SO_4$ | 1.17 | 1.08 | 1.10 |
| Cd | .0023 | .0010 | .0009 |
| F | .15 | .13 | .16 |
| V | .0146 | <.01 | <.01 |

**No measurement made

The results of Table 3 demonstrate that salts of good purity can be made from wet process phosphoric acid using a one-stage extraction operation and direct precipitation.

EXAMPLE 6

Example 4 was repeated as to the preparation of the first fraction material, except that sodium pyrophosphate was substituted in the same amount for the 10-34-0 ammonium polyphosphate to determine the effect of the polyphosphate without the ammonium ion present. A sufficient amount of anhydrous ammonia gas was added to 100 grams of the first fraction material to precipitate the P$_2$O$_5$ value in the loaded organic as ammonium polyphosphate salt. The composition of the raffinate and the salt are shown in Table 4.

TABLE 4

|  | Percent Distribution Of Feedstream, % | | Actual Composition, % | |
| --- | --- | --- | --- | --- |
|  | Raffinate | Salt | Raffinate | Salt |
| P$_2$O$_5$ | 31.9 | 68.1 | 30.7 | 58.4 |
| Al$_2$O$_3$ | 79.1 | 20.9 | 2.84 | .67 |
| Fe$_2$O$_3$ | 75.2 | 24.8 | 1.26 | .37 |
| MgO | 75.5 | 24.5 | 0.87 | .25 |

The present invention provides an economical method for separating phosphate values and impurities from wet process phosphoric acid. Although particular embodiments of the invention have been described in detail for purposes of illustration, various modifications may be made without departing from the spirit and scope of the invention. Accordingly, the invention is not to be limited except as by the appended claims.

What is claimed is:

1. A process for purifying impure phosphoric acid, comprising the steps of:
furnishing impure phosphoric acid;
adding to the impure phosphoric acid, to form a modified acid, a modifier selected from the group consisting of
a polyphosphate, and
a cation selected from the group consisting of ammonium ion and an alkali metal ion;
mixing the modified acid with a mixture of alcohols, the mixture of alcohols including both
a low molecular weight alcohol selected from the group of alcohols having from 1 to 3 carbon atoms, and mixtures thereof, and
a high molecular weight alcohol selected from the group of alcohols having from 4 to 12 carbon atoms, and mixtures thereof; and
separating the mixture of alcohols and prepared acid into two fractions, a first fraction including the high molecular weight alcohol and the phosphate values dissolved therein, and a second fraction including the low molecular weight alcohol and the impurities originally present in the impure phosphoric acid.

2. The process of claim 1, including the further step of separating the phosphate values from the high molecular weight alcohol of the first fraction, and recycling the separated high molecular weight alcohol to the step of mixing.

3. The process of claim 1, including the further step of separating the impurities from the low molecular weight alcohol of the second fraction, and recycling the separated low molecular weight alcohol to the step of mixing.

4. The process of claim 1, wherein both a polyphosphate and ammonium ions are added to the impure acid in the step of adding.

5. The process of claim 1, wherein the step of adding is accomplished by
diverting a portion of the impure acid to a reactor wherein the acid is heated and ammonia is added to the heated acid, whereby the orthophosphates in the acid are converted to polyphosphates, thereby forming a polyphosphate melt, and
introducing the polyphosphate melt into the impure acid.

6. The process of claim 5, wherein from about 5 to about 15 percent of the impure acid is diverted in the step of diverting.

7. The process of claim 1, wherein the low molecular weight alcohol is methanol.

8. The process of claim 1, wherein the high molecular weight alcohol is hexanol.

9. The process of claim 1, wherein the low molecular weight alcohol is methanol and the high molecular weight alcohol is hexanol, in a ratio of about 0.5 parts methanol to 4 parts hexanol to 1 part impure phosphoric acid.

10. The process of claim 1, wherein the impure phosphoric acid has from about 52 to about 72 percent phosphates by weight.

11. A process for purifying impure phosphoric acid, comprising the steps of:
furnishing impure phosphoric acid having from about 52 to about 72 percent by weight phosphate;
diverting from about 5 to about 25 percent of the impure acid to a pipe reactor wherein the acid is heated and ammonia is added to the heated acid, whereby the orthophosphates in the acid are converted to polyphosphates, thereby forming a polyphosphate melt;
introducing the polyphosphate melt into the impure acid;
mixing the prepared acid with a mixture of alcohols, the mixture of alcohols including both
a low molecular weight alcohol selected from the group of alcohols having from 1 to 3 carbon atoms, and mixtures thereof, and
a high molecular weight alcohol selected from the group of alcohols having from 4 to 12 carbon atoms, and mixtures thereof;
separating the mixture of alcohols and prepared acid into two fractions, a first fraction including the high molecular weight alcohol and the phosphate values dissolved therein, and a second fraction including at least some of the low molecular weight alcohol and the impurities originally present in the impure phosphoric acid;
separating the phosphate values from the high molecular weight alcohol of the first fraction;
recycling the separated high molecular weight alcohol to the step of mixing;
separating the impurities from the low molecular weight alcohol of the second fraction; and
recycling the separated low molecular weight alcohol to the step of mixing.

12. The process of claim 11, wherein the low molecular weight alcohol is methanol and the high molecular weight alcohol is hexanol, in a ratio of about 0.5 parts methanol to 4 parts hexanol to 1 part impure phosphoric acid.

13. The process of claim 11, wherein the step of separating the impurities is accomplished by distillation of the low molecular weight alcohol from the impurities.

14. The process of claim 11, wherein the step of separating the phosphate values is accomplished by
crystallizing the phosphate values;
separating the crystallized phosphate values from a portion of the high molecular weight alcohol; and drying the crystallized phosphate values from a portion of the high molecular weight alcohol; and drying the crystallized phosphate values.

15. The process of claim 14, wherein the step of crystallizing is accomplished by adding to the first fraction a cation selected from the group consisting of sodium, calcium, potassium, and ammonium.

16. A process for purifying impure phosphoric acid, comprising the steps of:

mixing the phosphoric acid with a mixture of at least two liquid extractants to cause the phosphate values and the impurities to be segregated into the respective extractants, the first extractant preferentially dissolving the phosphate values and the second extractant preferentially dissolving the impurities, one of the two extractants being hydrophilic and the other being hydrophobic; and separating the loaded hydrophilic extractant from the loaded hydrophobic extractant.

17. The process of claim 16, wherein at least one of the extractants is an alcohol.

18. The process of claim 16, including the additional step of:

recovering the phosphate value from its extractant.

19. The process of claim 16, including the additional step of:

adding a modifier to the aqueous solution to increase the tendency for the phosphate values to segregate to one extractant phase and the impurities to segregate to another extractant phase, the step of adding to be performed prior to the step of mixing.

* * * * *